(12) United States Patent
Pasteanu

(10) Patent No.: US 7,448,082 B2
(45) Date of Patent: Nov. 4, 2008

(54) METHOD FOR DEFINING AND CHECKING A CONNECTION ESTABLISHMENT AUTHORISATION, ASSOCIATED PROGRAM DATA PACKET, ASSOCIATED DEVICE AND ASSOCIATED PROGRAM

(75) Inventor: Calinel Pasteanu, Gilching (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 757 days.

(21) Appl. No.: 10/496,056

(22) PCT Filed: Nov. 4, 2002

(86) PCT No.: PCT/EP02/12296

§ 371 (c)(1),
(2), (4) Date: May 19, 2004

(87) PCT Pub. No.: WO03/045090

PCT Pub. Date: May 30, 2003

(65) Prior Publication Data

US 2005/0020253 A1    Jan. 27, 2005

(30) Foreign Application Priority Data

Nov. 19, 2001    (EP)    ................... 01127592

(51) Int. Cl.
| G06F 7/04 | (2006.01) |
| G06F 7/58 | (2006.01) |
| G06F 12/00 | (2006.01) |
| G06F 12/14 | (2006.01) |
| G06F 13/00 | (2006.01) |
| G06F 17/30 | (2006.01) |
| G06K 19/00 | (2006.01) |
| G11C 7/00 | (2006.01) |
| H04L 9/32 | (2006.01) |

(52) U.S. Cl. ........................................ 726/21; 717/173
(58) Field of Classification Search .................... 726/21
See application file for complete search history.

(56) References Cited

U.S. PATENT DOCUMENTS

| 4,621,285 | A | * | 11/1986 | Schilling et al. | ............ 380/223 |
| 5,239,294 | A | * | 8/1993 | Flanders et al. | ............ 340/5.74 |
| 6,195,546 | B1 | | 2/2001 | Chang et al. | ................ 370/351 |
| 6,341,373 | B1 | * | 1/2002 | Shaw | ........................ 717/173 |
| 6,707,809 | B1 | * | 3/2004 | Warrier et al. | .............. 370/351 |
| 7,103,575 | B1 | * | 9/2006 | Linehan | ...................... 705/64 |
| 2002/0048369 | A1 | * | 4/2002 | Ginter et al. | ................ 380/277 |
| 2003/0037261 | A1 | * | 2/2003 | Meffert et al. | .............. 713/201 |

FOREIGN PATENT DOCUMENTS

GB    2 353 918    3/2001

* cited by examiner

*Primary Examiner*—Kambiz Zand
*Assistant Examiner*—Dant B Shaifer Harriman
(74) *Attorney, Agent, or Firm*—Bell, Boyd & Lloyd LLP

(57) ABSTRACT

The present invention relates to, inter alia, a method according to which an authorization datum is predefined for a program before transmission to an appliance of a user, the value of the datum indicating a right to establish a connection. A security program which is independent of the program cited authorizes the establishment of a connection via a data transmission network during the running of the program, according to the value of the authorization datum, or rejects the establishment of the connection.

14 Claims, 4 Drawing Sheets

METHOD FOR DEFINING AND CHECKING A CONNECTION ESTABLISHMENT AUTHORISATION, ASSOCIATED PROGRAM DATA PACKET, ASSOCIATED DEVICE AND ASSOCIATED PROGRAM

BACKGROUND OF THE INVENTION

The present invention generally relates to a method wherein a connection establishment is initiated over a data transmission network upon execution of a program.

The data transmission network transmits the data as circuit switched data or in data packets. An example for a circuit switched data transmission network is a telecommunication network which is used for transmission of voice data. However, there are also circuit switched data transmission networks which allow the transmission of data packets; e.g., the GPRS method (General Packet Radio Service). An example of a data transmission network in which the data is transmitted in data packets is the Internet. Packet data transmission in the Internet is connectionless at lower packet layers. However, at higher protocol levels, just as in a circuit switched data transmission, network connections are established for which specific network resources are seized; for example, transmission channels or access ports. After transmission of the data, the connection is cleared down again.

An object of the present invention is to specify a simple and effective method for defining and checking a connection establishment authorization, which, in particular, prevents an unauthorized connection establishment. In addition, an associated program data package, an associated device and an associated program are to be specified.

With the method in accordance with the present invention, an authorization data item, for which the value specifies connection setup rights, is prespecified for a program which, when executed, establishes connections over a data transmission network before such program is transferred to a device of a user. For example, the value allows unrestricted connection establishment, forbids establishing connections or makes establishing connections dependent on the presence of specific conditions. The program is transferred along with the authorization data item to a user's device; for example, on a data medium or via a data transmission network. The data medium is, for example, a magnetic or optical memory medium.

The transferred program and the authorization data are stored in a memory unit of the device. On execution of the program, a connection establishment is initiated via a data transmission network. Before a connection can be established, however, a security program, which is a program independent of the program to be executed, uses the value of the authorization data to check whether the user of the program or the program itself is authorized to establish a connection. Depending on the value of the authorization data, the connection establishment is allowed or rejected.

A method in accordance with the present invention provides the option of performing a uniform connection authorization for a number of different programs. Thus, the connection establishment authorization is checked not only by the individual programs themselves, but also by the independent security program. In addition the user is not burdened with specific questions of authorization when connections are established. A yes or no decision by the user is merely required as to whether they agree to a connection establishment. As such, the user does not have to have any specific knowledge about the program or the security program with the aid of which he/she could specify and change connection establishment authorizations. The method in accordance with the present invention also can be executed without a system administrator who needs specific knowledge to issue connection establishment rights.

In a further embodiment of the method in accordance with the present invention, the method is executed in a terminal of a data transmission network. With terminals in mobile radio data transmission networks, in particular, the problem arises that there is no one, such as an administrator, with sole unrestricted authorization for the terminal who could, for example, make settings. Thus, as well as the user of the terminal, there is the manufacturer of the terminal and the operator of the mobile radio network. The method in accordance with the present invention allows the authorization data to be specified in such a way that both the user and the device manufacturer, as well as the network operator, are in agreement with this specification and, where necessary, are also authorized and in a position to check the specification.

For a further embodiment of the method in accordance with the present invention, the authorization data is transferred outside the program available in machine code; i.e., outside what is known as a machine program or outside the program available in byte code. The machine program contains commands which are contained in the command set of a processor which is to execute the program. The byte code, on the other hand, is an intermediate code between source code and machine code. Commands in byte code must first be translated into processor-dependent machine commands with the aid of a compiler program. For example, byte code is created when the JAVA programming language is used to allow programming which is independent of the type of processor which eventually will execute the machine commands created from the byte code. The fact that the authorization data is transferred outside the program allows items to be specified for a uniform method, for example, which can be accessed without any knowledge of the program structure.

In a further embodiment, there are at least two kinds of program types and at least two values for the authorization data. Permissible assignments of the program types to at least one value, in each case, are specified; for example, in accordance with type of a table. The table header, for example, contains at least three values for the authorization data. The table lines are, for example, assigned to at least three types of program. There are crosses in the fields of the table, for example, when an assignment exists. If there is no assignment, the fields are blank. At least one value is assigned to each program type. However, a number of permitted values can be assigned to one program type. The lines of the table differ from each other in each case in an exemplary embodiment.

The value of the authorization data is determined in such embodiment depending on the program type, with the aid of the assignments or the table. Thus, the authorization data has a value in accordance with a prespecified permitted assignment.

Such an assignment is particularly well suited, in accordance with another embodiment, to being defined in a standard; preferably, in an internationally valid standard. As already mentioned, the present invention can be used with mobile radio devices so that the standardization body, in particular, is a body which specifies standards for mobile radio stations or mobile radio networks.

For another embodiment, there are at least two of the following program types:

a third-party supplier program type to which programs are assigned which are not provided by the manufacturer of the device and not by the network operator of the network over which the connection is established, but by a third party;

a device manufacturer program type to which programs are assigned which are provided by the manufacturer of the device, such as ex-works, that is before the device is delivered to the user; and a network operator program type to which programs are assigned which are made available by the operator of the network over which the connection is established.

The programs of each type establish connections over the data transmission network. Connections to the manufacturer or network operator are established in the network, for example, for service purposes or to provide specific IN services for the user. However, there are a large number of other program types that can be defined.

In another embodiment of the method in accordance with the present invention there are at least two of the following values for the authorization data:

a value which only makes it possible to establish a connection with the agreement of the user;

a value which allows unrestricted connection establishment; and a value which allows a connection to be established depending on the amount of user credit.

The values naturally differ from one another to allow a distinction to be made. However, a number of further values for other conditions can be defined.

In yet another embodiment of the method in accordance with the present invention, the value of the authorization data no longer can be changed in the user's device. This measure guarantees that, once specified, the value of the authorization data cannot be misused by changing it. The misuse does not have to originate from the user, but also can originate from third parties.

In an alternative embodiment, the value of the authorization data can only be changed with the aid of the security program. This measure also allows misuse to be prevented without imposing too stringent restrictions. For example, misuse can be effectively prevented if the security program can be called by the user; for example, by specifying a password.

In another embodiment of the method in accordance with the present invention, the security program records the approval and/or rejection of a connection establishment in a log file. If a dispute arises later between a number of those involved, for example between the user and the network operator, about the level of connection costs, the log file can be used as evidence which both sides also accept when adhering to specific conditions.

In another embodiment, at least one digital certificate and/or a digital key is transmitted together with the authorization data. The digital keys are used for executing electronic encryption procedures; for example, methods such as those discussed in ITU-T (International Telecommunication Union—Telecommunication Sector) Standard X.509. Moreover, the authorization data is transmitted digitally encrypted and is stored digitally encrypted. The log file, too, can be encrypted with a digital key. The encryption excludes unauthorized changes to the data. In addition, data stored encrypted is better suited as verification of the processes relating to the connection than data stored unencrypted.

The present invention also relates to a program data package which on the one hand, contains program data in a machine code and a byte code and, on the other hand, contains metadata. The metadata includes the authorization data. In further embodiments developments, the program package is transferred in accordance with the inventive method or its further developments. In particular, the authorization data is defined in accordance with the method explained above.

Furthermore, the present invention relates to a device, particularly a data processing system, which is used for executing the method in accordance with the present invention. In further embodiments, the device contains units which allow execution of the various inventive methods.

The present invention lastly relates to a program which in particular provides the functions of the security program. In certain embodiments of the program, the program is structured in such a way that it is suitable for executing a method in accordance with the present invention or of its various embodiments.

Additional features and advantages of the present invention are described in, and will be apparent from, the following Detailed Description of the Invention and the figures.

DETAILED DESCRIPTION OF THE INVENTION

Figure 1:
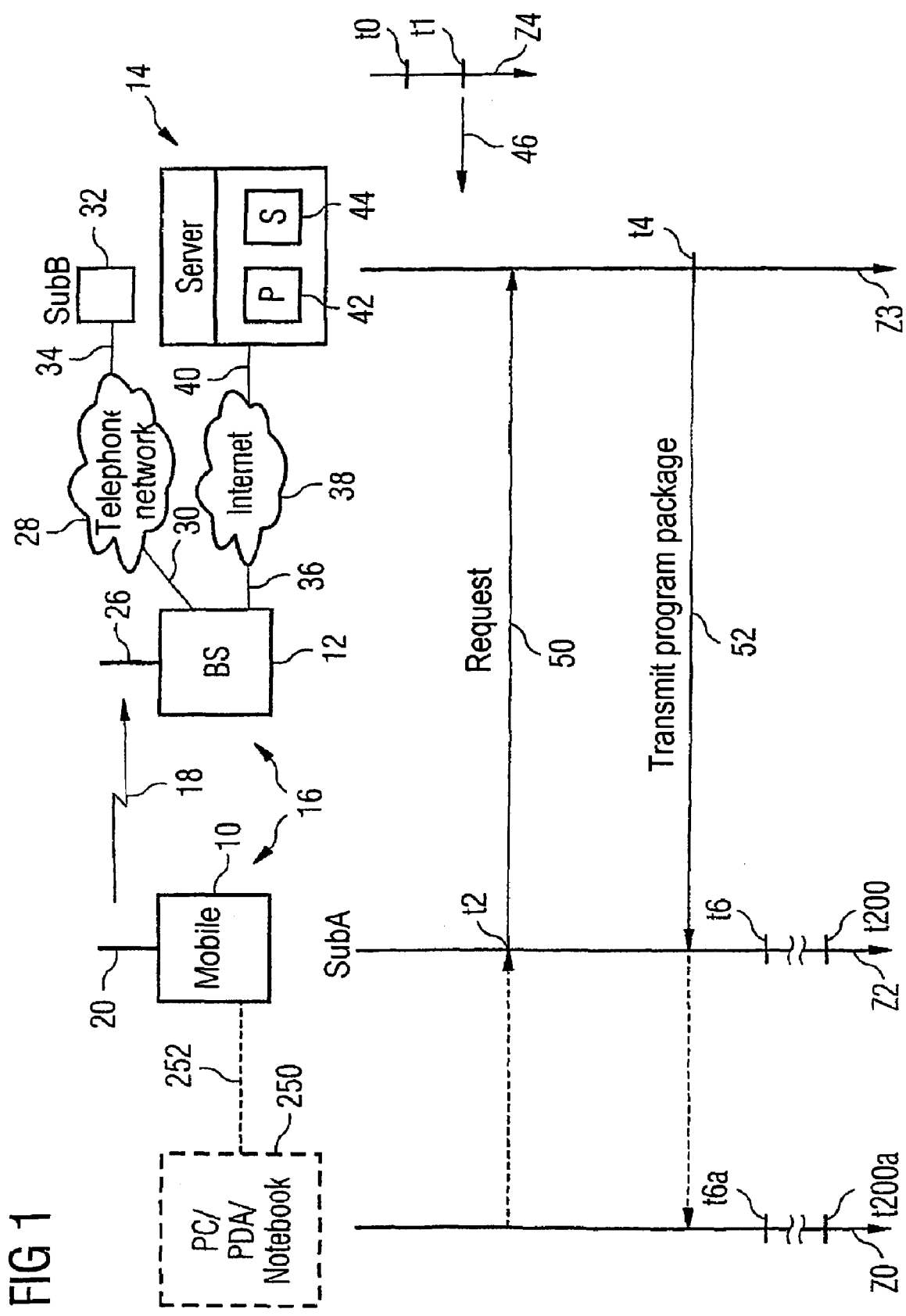
FIG. 1 shows procedural steps for creating, transmitting and executing a program package.

FIG. 1 shows procedural steps for creating and transmitting a program package and for executing a program contained in the program package. The structure of the program package is shown below in more detail on the basis of FIG. 2. In a first exemplary embodiment, a terminal 10, a base station 12 and a server 14 are involved in the execution of the procedural steps.

The terminal 10 and the base station 12 components of a mobile radio data transmission network 16 which operates, for example, in accordance with the GSM (Global System for Mobile Communication) standard. Between the terminal 10 and the base station 12 there is a radio transmission link 18 which operates bidirectionally.

The terminal 10 is also referred to as a "mobile" and, as well as a processor and an internal memory unit not shown in the diagram, includes an antenna 20. In addition, the terminal 10 has a display unit not shown in the diagram and an input unit, such as a keyboard, also not shown.

The base station 12 contains an antenna 26 and processing units which are known but are not shown in FIG. 1. In addition, the base station 12 is connected to a circuit switched telephone network of Deutsche Telekom AG. Between the base station 12 and the telephone network 28 lies an access line 30. FIG. 1 shows a subscriber SubB whose telephone 32 is connected via an access line 34 to telephone network 28. In addition, the base station 12 is connected via an access line 36 with the Internet 38 in which the data is transmitted in accordance with the Internet protocol. The server 14 is connected via an access line 40 with the Internet 38 and contains a processor 42 and a memory unit 44.

Processes which relate to the terminal 10 are shown in FIG. 1 with the aid of a time stream Z2. A time stream Z3 is used to present the processes in which the server 14 is involved or which the server 14 executes. In addition, two further time streams Z0 and Z4 are shown in FIG. 1 for which the meaning will be given by the explanations below. Earlier points in time lie further up the time streams Z0 to Z4 than later points in time. The same points in time lie at the same height.

At a point in time t0, the manufacturer of a program package assembles the program package. The structure of the program package is shown below in more detail on the basis of FIG. 2. The program package is stored at a point t1 in the memory unit 44 of the server 14, see arrow 40, and also can be transmitted, for example, using WAP (Wireless Application Protocol) to terminal 10.

For example, a user SubA of the terminal 10 makes a request 50 to server 14 at point t2 to transmit the program package. The request 50 is transmitted over the radio transmission link 18, the base station 12 and the Internet 38 to server 14.

Server 14 processes the request 50 and transmits the program package, beginning at a point in time t4, see arrow 52. After the receipt of the program package in terminal 10, the program contained in the program package is installed at the point in time t6. The procedural steps executed here are explained in more detail below on the basis of FIG. 3.

At a later point in time t200, the installed program will be executed, in which case a connection establishment also may be necessary via the mobile radio data transmission network 16 and, if necessary, via the telephone network 28 or the Internet 38. The procedural steps executed during execution of the program are also explained in more detail below on the basis of FIG. 3.

Figure 4:
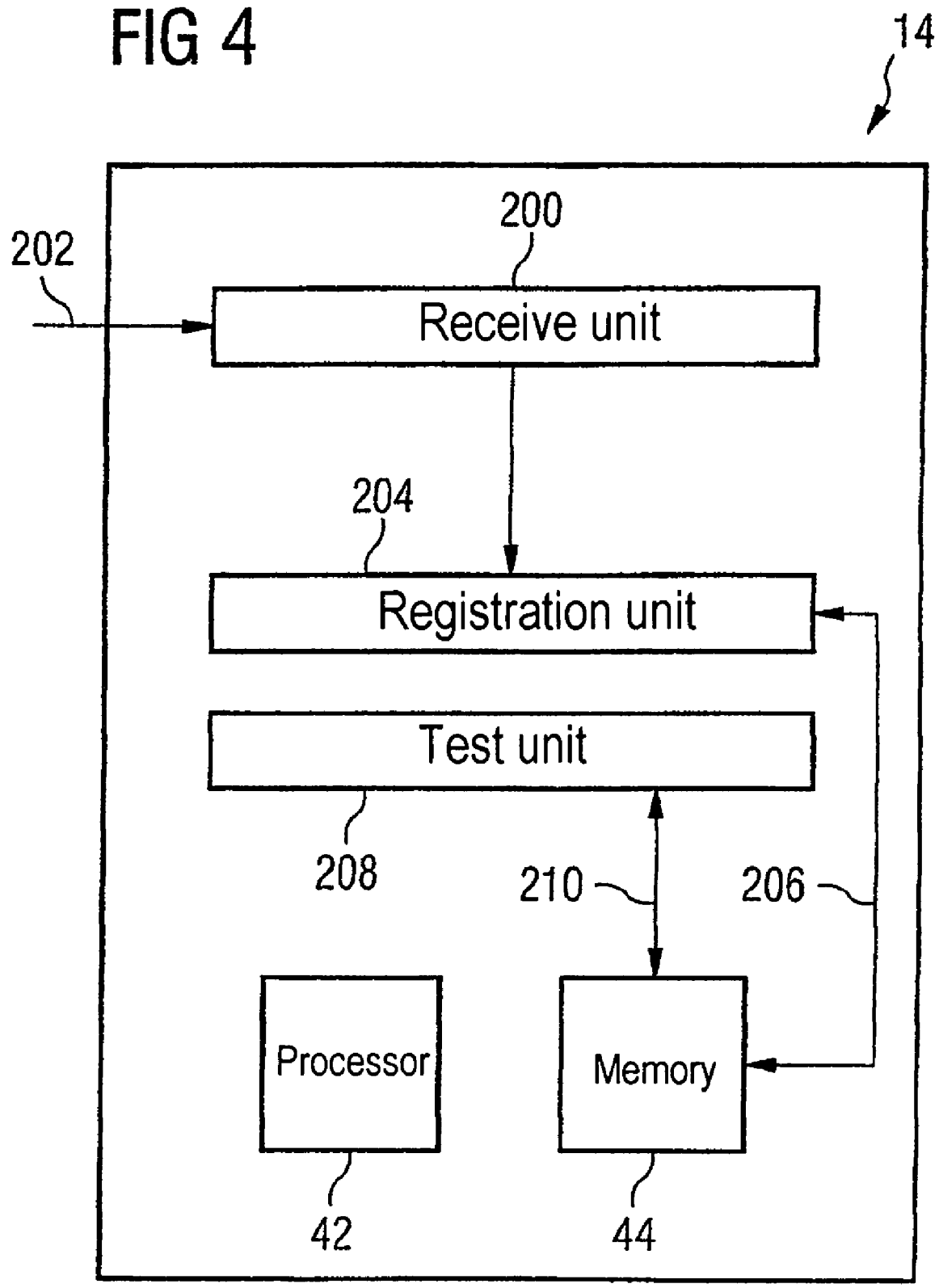
FIG. 4 shows units employed for transmitting a program package and executing at the commands of the program package.

The units and processes not yet explained on the basis of FIG. 1 are explained in more detail after the explanations for FIG. 4. These units are used for an alternate exemplary embodiment.

Figure 2:
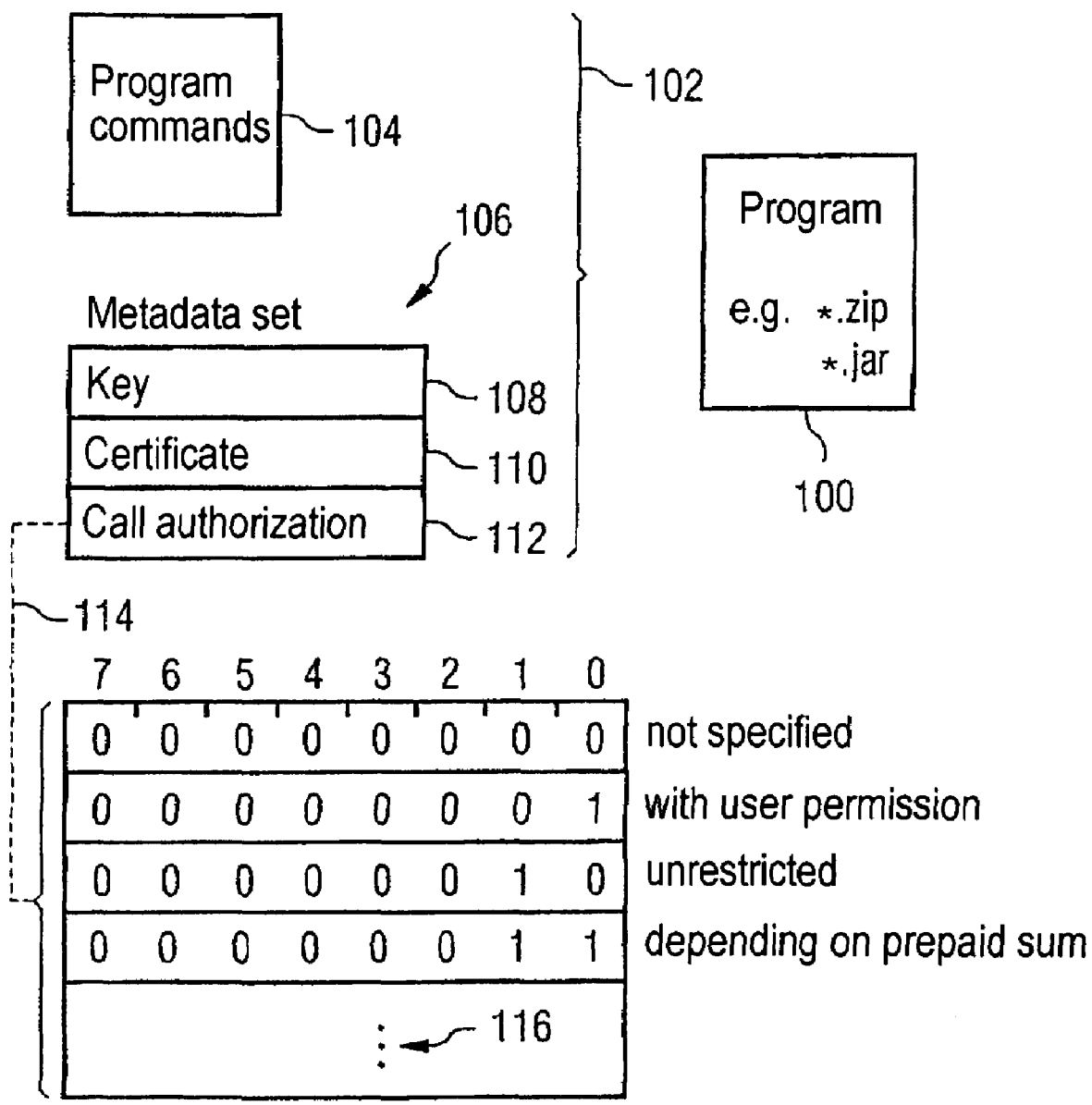
FIG. 2 shows the structure of the program package.

FIG. 2 shows the structure of the program package 100 which, as indicated by a parenthesis 102, contains the program commands 104 of the program and a metadata set 106. The program commands 104 are used, for example, to provide the functions of an e-mail program, which sends or receives electronic mail, and to provide the functions of a games program. On execution of the program commands 104, a connection is established; for example, to the telephone network 28 or the Internet 38 (see FIG. 1). An e-mail or a new game variant is transmitted via the connection, for example.

The metadata set 106 contains data which is not needed for execution of the program commands 104 but provides help functions. Thus, the metadata set 106 contains an electronic key 108, an electronic certificate 110 and an item of authorization data 112. The electronic key 108 is used, for example, for encrypting the program commands 104 and for encrypting the authorization data 112. The certificate 110 is issued by the certification authorities and confirms the validity of the key 108.

The authorization data 112 defines the rights of the program 104 to establish connections. As indicated by a dotted line 114, different values are defined for the authorization data:

the value of zero indicates that the call authorization has not been specified;

a value of one indicates that connections may only be executed with the explicit permission of subscriber SubA;

a value of two indicates that connections may be established without restriction;

a value of three indicates that connections may only be established depending on a specific pre-paid sum, for example if a pre-paid sum of DM 50 is available for subscriber SubA, and further values 116 for further conditions; and the values are, for example, defined in an internationally valid standard.

In the exemplary embodiment, authorization data 112 has a value of one, for example, so that connections only can be established with the explicit permission of the user; i.e., of subscriber SubA. The permission can be obtained just once for many connections or obtained for each connection established.

The program package 100 will, for example, be compressed with a known compression program; e.g., using what is known as a ZIP program or with the aid of a JAVA compression program. In the first case the program package 100 has the file extension "zip." In the second case program package 100 has the file extension "jar."

Figure 3:
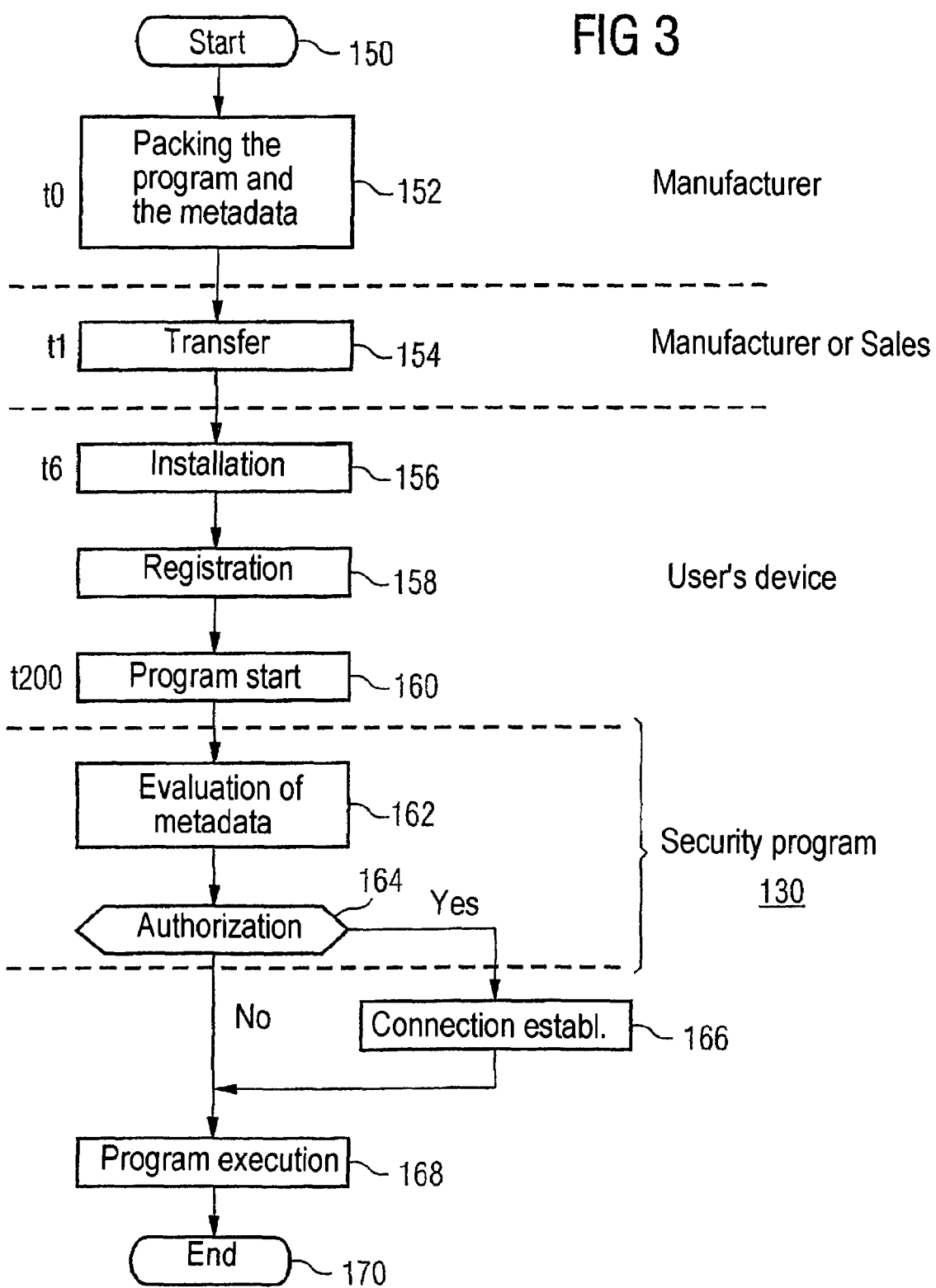
FIG. 3 shows procedural steps for checking an item of authorization data.

FIG. 3 includes procedural steps for checking the authorization data 112. The method begins at a procedural step 150 which is executed at a point in time t0. In the following procedural step 152, the manufacturer of the program, as is also explained above on the basis of the FIG. 2, packs the program commands 104 and the metadata set 106, including authorization data 112.

In a procedural step 154, the manufacturer of the program transfers the program package 100 to the server 14 (see FIG. 1), time t1 and arrow 46.

At point in time t6, the program package 100 is unpacked on terminal 10 and the program is stored or installed in the memory unit of the terminal 10 so that it can be called by the subscriber SubA, see procedural step 156. In a following procedural step 158, the program will be automatically registered with a security program of the terminal 10.

A procedural step 160 is executed at point in time t200 when subscriber SubA wishes to send an e-mail with his/her terminal 10. To send the e-mail, the e-mail program must establish a connection to the Internet 38. On access to the hardware needed to do this, a security program 130 is called automatically.

In a procedural step 142, the security program 130 evaluates the value of the authorization data 112. In the exemplary embodiment, the authorization data, as already mentioned, has a value of one. As such, the user or the subscriber SubA must be asked for a manual confirmation before a connection is established. The security program 130 thus generates an input request on the display unit of terminal 10. In the exemplary embodiment, let us assume that subscriber SubA agrees to connection establishment. Therefore, security program 130 also releases the hardware needed for connection establishment. Procedural step 164 is followed directly by a procedural step in which the e-mail program establishes the connection to the Internet 38 and sends the e-mail. After procedural step 166, the execution of the e-mail program is continued in a procedural step 168.

If, on the other hand, the security program 130 establishes in procedural step 164 that the subscriber SubA does not agree to the connection establishment, procedural step 164 is followed directly by a procedural step 168. Subscriber SubA can, in this case, not send an e-mail.

The method is ended in a step 170 with the closing of the e-mail program. When an e-mail is next sent or received, the procedural steps 160 to 170 are executed once more.

FIG. 4 shows the units of server 14 used for transmission and the execution of the e-mail program. A receiver unit 200 receives the program package 100, see arrow 102. The receiver unit 200 directs the program package 100 without intermediate storage to a registration unit 204 which executes the installation and the registration of the program. When this is done, the program is stored in memory 44, see arrow 206.

A test unit 208 takes over the functions of the security program 130 and checks before connection establishment whether the authorization data permits the connection to be established. The test unit 208 in this case accesses the authorization data 112 stored in memory 44, see arrow 210.

In another exemplary embodiment, the functions of the units 200, 204 and 208 are provided by switching units which do not execute any program. Mixed forms having pure switching solutions and program-controlled solutions are also possible.

In a further exemplary embodiment, the terminal 10 is only used as a network access unit. The program is transmitted into a data processing system 250 separate from terminal 10, see FIG. 1. The data processing system 250 is, for example, a personal computer, a PDA (Personal Digital Assistant) or a notebook. Data processing system 250 and terminal 10 are typically connected via an infrared interface 252 or via a cable for serial or parallel data transmission. The request 50 in this exemplary embodiment is sent by the data processing system 250. In addition, the program package is transmitted from terminal 10 to data processing system 250 where procedural steps are then executed at points t6a and t200a, which correspond to those at points t6 or t200, see time stream Z0. Otherwise, the procedural steps explained on the basis of FIG. 1 remain unchanged.

In a further exemplary embodiment, terminal 10 and data processing system 250 are present in one device. Such devices are increasingly commercially available.

Although the present invention has been described with reference to specific embodiments, those of skill in the art will recognize that changes may be made thereto without departing from the spirit and scope of the present invention as set forth in the hereafter appended claims.

The invention claimed is:

1. A method for defining and checking a connection establishment authorization, comprising:
    specifying for a program, before transfer of the program to a device of a user, an item of authorization data of which a value of the item specifies connection establishment rights;
    transferring the program jointly with the authorization data to the device;
    storing the program in a memory unit of the device together with the authorization data;
    initiating a connection establishment, on execution of the program via a data transmission network; and
    performing one of the steps of allowing and rejecting, via a security program which is independent of the program, the connection establishment depending on the value of the authorization data.

2. The method in accordance with claim 1, wherein the method is executed in a terminal of a mobile radio data transmission network.

3. The method in accordance with claim 1, wherein the authorization data is transmitted outside machine commands or commands in a byte code of the program.

4. The method in accordance with claim 1, wherein at least two kinds of program types and at least two values for the authorization data are defined, permitted assignments of program types to at least one value are prespecified, and the value of the authorization data, depending on the program type, has a value permitted in accordance with the assignment.

5. The method in accordance with claim 4, wherein the assignment is defined in a standard, preferably in an internationally valid standard.

6. The method in accordance with claim 4, wherein at least one of a third-party supplier program type is defined to which at least one program is assigned which is made available by a third-party supplier who is distinct from a manufacturer of the device and from a network operator of the network via which the device establishes the connection, and a device manufacturer program type is defined to which at least one program is assigned which is made available by a manufacturer of the device, and a network operator program type is defined to which at least one program is assigned which is made available by a network operator of the data transmission network via which the device establishes the connection.

7. The method in accordance with claim 4, wherein at least one of a value allows a connection establishment with agreement of a user, a value allows an unrestricted connection establishment, and a value allows a connection establishment depending on an amount of a credit, and wherein the values differ from one another.

8. The method in accordance with claim 1, wherein one of the value of the authorization data cannot be changed in the device, and the value of the authorization data only can be changed with aid of the security program.

9. The method in accordance with claim 1, wherein the security program records at least one of approval and rejection of a connection establishment in a log file.

10. The method in accordance with claim 1, wherein, together with the authorization data, at least one of at least one digital certificate and a digital key are transmitted.

11. The method in accordance with claim 10, wherein the authorization data is at least one of transmitted digitally encrypted and stored digitally encrypted.

12. The method in accordance with claim 9, wherein the log file is stored digitally encrypted.

13. A data processing system for defining and checking a connection establishment authorization, comprising:
    a program execution unit for executing a program which initiates the connection establishment via a data transmission network; and
    a test unit for allowing or rejecting the connection establishment depending on a value of an authorization data item assigned to the program, wherein the value specifies connection establishment rights; and
    a receive unit for receiving the program together with the authorization data, wherein the program is jointly transferred with the authorization data to a device of a user, the program is stored in a memory unit of the device together with the authorization data, the connection establishment is initiated on execution of the program via the data transmission network, and the connection establishment is allowed or rejected, via a security program which is independent of the program, depending on the value of the authorization data.

14. An article of manufacture with a computer program embodied therein, the computer program comprising:
    a code segment for effecting determination of a value of an authorization data item, the value specifying a connection establishment right;
    a code segment for effecting allowance or rejection of a connection establishment of another program;
    a code segment for effecting specification of a program, before transfer of the program to a device of a user, the item of authorization data;
    a code segment for effecting transfer of the program jointly with the authorization data to the device;
    a code segment for affecting storage of the program in a memory unit of the device together with the authorization data;
    a code segment for affecting initiation of the connection establishment, upon execution of the program via a data transmission network; and
    a code segment for affecting allowance or rejection, via a security program which is independent of the program, the connection establishment depending on the value of the authorization data.

* * * * *